Patented Jan. 5, 1943

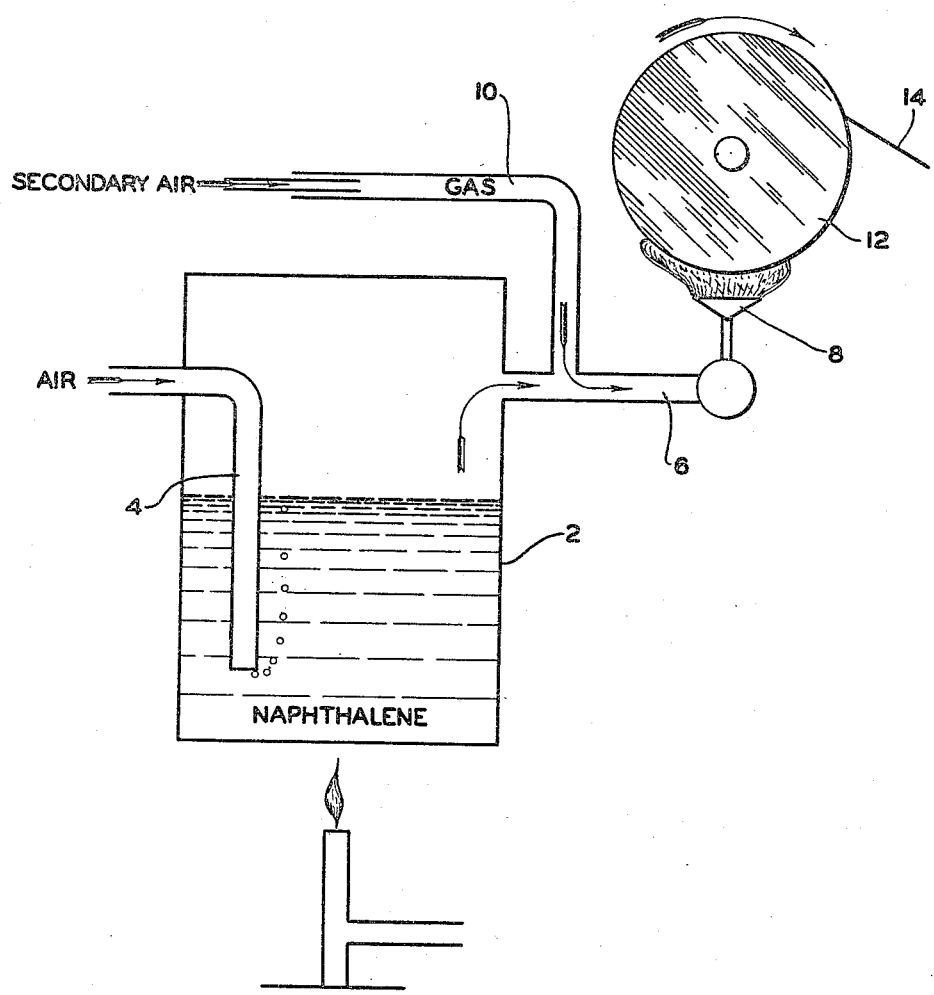

2,307,050

UNITED STATES PATENT OFFICE 2,307,050

PROCESS FOR THE PREPARATION OF ACTIVE CARBON BLACK

Harry Kloepfer, Cologne, Germany, assignor, by mesne assignments, to Chemical Marketing Company Inc., New York, N. Y.

Application August 23, 1938, Serial No. 226,384

5 Claims. (Cl. 23—209.8)

My present invention relates to the preparation of active carbon- or gas-black and is more particularly concerned with the solution of the technically and economically important problem of preparing active gas-black corresponding in its properties to American gas-black and adapted to replace the same in its utilization as a filler for compounding with rubber in the production of rubber articles such as rubber tires for automobiles.

According to my invention this object is achieved by burning a mixture composed of naphthalene vapour or the like, combustible gases of low value, such as illuminating gas or producer gas, and non-combustible oxygen-containing gases, such as air, in slot-shaped burners.

It has already been proposed to prepare carbon-black by burning a mixture of benzene vapours and the like with combustible gases of low value, such as illuminating gas, blast furnace gases and the like. This initial mixture was intended to replace the oil gas obtained from paraffin oil and previously frequently used for the preparation of carbon-black.

It was then further proposed for the same purpose to employ instead of the combustible gases, non-combustible gaseous combustion products or atmospheric air. For this purpose a combustible gas mixture was prepared from vaporised hydrocarbons, such as benzine, petroleum, naphthalene and the like, and non-combustible gases or air and this gas mixture was used as a substitute for oil gas in the preparation of carbon-black.

It could not be concluded from the fact that in the preparation of carbon-black it is known that oil gas may be replaced by mixtures of vaporised hydrocarbons with combustible gases of low value and the further fact that such mixtures may in turn be replaced by mixtures, which instead of combustible gas of low value, contain non-combustible substances such as air, that the frequently investigated problem of preparing active carbon- or gas-black of the American gas-black type could be solved by burning mixtures, which, in addition to the main constituent such as naphthalene, also contain combustible gases such as illuminating gas or producer gas, and non-combustible oxygen-containing gases such as air, in burners of a specific type. Suitable burners are according to my invention flat-flame burners. The fact that the use of flat-flame burners is known per se for the production of carbon- or gas-black from American natural gas does not alter the position.

The accompanying drawing diagrammatically illustrates the process by means of an apparatus for performing the process.

Naphthalene residues and the like constitute the chief starting materials for carrying out the process of the instant invention. The naphthalene in tank 2 can be charged with air or other oxygen containing gas mixtures entering tank 2 through pipe 4, and thus vaporized. The mixture of air and vaporized naphthalene is conducted through pipe 6 to burners 8. Combustible gas, for example, illuminating gas, together with secondary air, is introduced through pipe 10 into pipe 6 between tank 2 and burners 8. From the burners 8, the products of combustion are deposited upon a cooling surface such as the drum 12 which is provided with a scraper 14 for removing deposited carbon-black.

The relative proportions of naphthalene vapour and gas-air mixture and the relative proportions of gas and air may vary within certain limits. One method of procedure is for example to vaporise weighted quantities of naphthalene or the like and to admix the resulting vapour with measured quantities of the gas-air mixture. An alternative procedure is for example first to prepare a suitable mixture of naphthalene vapour and air and to add thereto the requisite quantity of gas, or for example to conduct the gas-air mixture through or over the substance to be vaporised, for example naphthalene, and thereby to saturate it with the vaporised substance. In order to prevent the vaporised substance from separating from the mixture it is advisable to heat the mixture to suitable temperatures, for example to about 200° C.

The relative proportions of gas and air may for example amount to about 25% of illuminating gas and about 75% of air, measured at room temperatures. The more gas is added to the mixture, the greater is the speed of ignition. The relative proportions of gas-air mixture and naphthalene may for example be such that for about 1 cubic metre of a mixture of 25% of illuminating gas and 75% of air (measured at room temperature) about 350–700 gms., preferably about 600 gms. of naphthalene in the form of vapour are employed.

The process of my invention may for example be carried into effect by burning a mixture of approximately the foregoing composition in burners, which produce a flat, spread-out flame, the rate of outflow being so regulated that the flame burns as uniformly as possible and does not become torn off. The spread of the flame may for example be maintained between about 5 and 15 cms., and the slot width of the burner may for example amount to 0.5 to 1.5 mms. preferably 0.7 to 1 mm.

The carbon- or gas-black formed is caused to deposit on suitable cooling surfaces. By regulating the distance of the cooling surface from the flame the quality of the carbon-black may be influenced. This distance, when the other working conditions are as indicated above, may for example amount to 35 mms. In general it is advisable so as to select the working conditions and particularly the distance from the cooling surface to the flame that the amount of empyreuma contained in the resulting carbon-black does not amount to more than 1–2%. If the distance is increased beyond a certain limit extensive combustion takes place and accordingly the yield of carbon-black is reduced. If the distance is reduced below a certain limit the amount of empyreumatic substances contained in the carbon-black will become undesirably increased.

What I claim is:

1. A process for the production of active carbon-black comprising mixing combustible gases of low value with a greater proportion of non-combustible gases containing oxygen, adding from 350 gms. to 700 gms. of naphthalene per one cubic meter of the gas mixture, burning the combined gases and naphthalene in slot shaped burners, and depositing the carbon-black thus formed on a cooled surface.

2. A process for the production of active carbon-black comprising mixing naphthalene vapors, air and illuminating gas in the ratio of a major portion of air with respect to the gas and from 350 gms. to 700 gms. of naphthalene per one cubic meter of the air-gas mixture, burning said mixture in slot shaped burners, and depositing the carbon-black thus formed upon a cooled surface.

3. A process as in claim 2 in which a part of said air is introduced into the mixture of gas, air and vapors as secondary air prior to burning said mixture in said burner.

4. A process for the production of active carbon-black comprising mixing naphthalene vapors, combustible gases of low value and non-combustible gases containing oxygen, the proportion of the mixture being from 350 gms. to 700 gms. of naphthalene per one cubic meter of a gas mixture composed of approximately 25% combustible gas and 75% non-combustible gas (measured at room temperature), burning said vapors and gases in slot shaped burners, and depositing the carbon-black thus formed on a cooled surface.

5. A process as in claim 4 in which said non-combustible gas consists of air, and a part of which is introduced into said mix of vapors and gases as secondary air prior to the burning of said mix in said burners.

HARRY KLOEPFER.